US009473606B1

(12) United States Patent
Sumida (10) Patent No.: US 9,473,606 B1
(45) Date of Patent: Oct. 18, 2016

(54) POLE WITH SMARTPHONE SUPPORT AND SHUTTER RELEASE

(71) Applicant: E-filliate, Inc., Rancho Cordova, CA (US)

(72) Inventor: Wesley K. Sumida, Fair Oaks, CA (US)

(73) Assignee: E-filliate, Inc., Rancho Cordova, CA (US)

( * ) Notice: Subject to any disclaimer, the term of this patent is extended or adjusted under 35 U.S.C. 154(b) by 79 days.

(21) Appl. No.: 14/505,723

(22) Filed: Oct. 3, 2014

Related U.S. Application Data (60) Provisional application No. 61/888,109, filed on Oct. 8, 2013.

(51) Int. Cl.
*G06F 15/00* (2006.01)
*H04M 1/04* (2006.01)
*H04N 5/232* (2006.01)

(52) U.S. Cl.
CPC ........... *H04M 1/04* (2013.01); *H04N 5/23203* (2013.01)

(58) Field of Classification Search
CPC ... H04W 88/02; H04M 1/04; H04M 1/7253; H04N 5/232

USPC ................ 455/550.1, 556.1, 557, 90.1–90.3, 455/575.1, 575.3, 575.4; 709/203, 227
See application file for complete search history.

(56) References Cited

U.S. PATENT DOCUMENTS

| 2012/0181979 A1* | 7/2012 | Hudspeth | F16M 11/28 |
| | | | 320/108 |
| 2014/0146193 A1* | 5/2014 | Yang | H04N 5/23203 |
| | | | 348/211.4 |

* cited by examiner

*Primary Examiner* — Sam Bhattacharya
(74) *Attorney, Agent, or Firm* — Heisler & Associates

(57) ABSTRACT

An assembly is provided including a pole and a smartphone support. The pole is preferably adjustable in length and removably attachable to the smartphone support. The smartphone support is preferably configured as a clamp with an upper arm biased toward a base and with fingers therebetween which can engage edges of a smartphone to hold the smartphone therebetween. A trigger is provided on a handle of the pole which interfaces with the smartphone, such as by a cable removably connectable to an accessory port on the smartphone or wireless transmitter to a receiver in the smartphone, so that the trigger on the handle can operate a camera within the smartphone. A vent coupling is also provided on the support for attachment to a louver of an air conditioning vent or similar structure, typically with the pole removed from the support.

17 Claims, 4 Drawing Sheets

*Fig. 10*

POLE WITH SMARTPHONE SUPPORT AND SHUTTER RELEASE

CROSS-REFERENCE TO RELATED APPLICATIONS

This application claims benefit under Title 35, United States Code §119(e) of U.S. Provisional Application No. 61/888,109 filed on Oct. 8, 2013.

FIELD OF THE INVENTION

The following invention relates to accessories attachable to a smartphone or other personal electronic device having a camera therein, which include a clamp portion to hold the smartphone and accessories to allow the clamp and smartphone to be supported in various positions, including on the end of a pole or on a louver adjacent a vent.

BACKGROUND OF THE INVENTION

Cellular phones have developed to include a variety of different enhanced features, enabling the phone to be a useful device for a variety of purposes other than merely wireless communications. When such a phone includes a display and has the capability to access information from the internet, it is generally referred to as a "smartphone." Examples of such cellular phones which are also capable of accessing the internet include the iPhone line of cell phones from Apple, Inc. of Cupertino, Calif. and the Galaxy line of cell phones from Samsung Electronics Co., Ltd. of Korea.

Other devices which are similar to these internet accessing cellular phones include cellular phones which might not access the internet but otherwise have other features thereon, especially including a camera built into the cell phone and the ability to transmit the photos by email, an SMS service or otherwise. Still other devices which are similar in many respects to multi-feature cell phones but which do not include cellular telephone equipment therein. An example of such a device would be an iPod from Apple, Inc. which includes a camera. For convenience in this description all such personal electronic devices are generally referred to by the term "smartphone."

One important attribute of any such device within this smartphone description is that the smartphone have a camera built into the device which can take either still images, video or both. Various different features of this camera are supplied by hardware within the smartphone including a lens, some form of aperture and some form of shutter to activate and deactivate the camera. The shutter could be mechanical where it physically blocks or allows light to impact light sensors within the camera hardware or could be electronic, such as in the form of light sensing devices being activated or deactivated or other portions of electronics within the camera being powered or unpowered in response to the shutter.

Other portions of this camera operating on the smartphone are enabled within software running on the smartphone. For instance, a display on the smartphone typically acts as a view finder to show a user what picture is about to be taken. Software operating on the smartphone delivers a signal to the display to cause the appropriate image to appear on the display. Other features such as a zoom feature can be enabled either by buttons on the smartphone or through interaction with software through the display if it is in the form of a touch screen display. Other forms of inputs could also conceivably be utilized for control of the camera.

When taking pictures or video with a smartphone it is often desirable to have a camera angle which is spaced from the user. For instance, when taking a self-portrait it is desirable to have the camera positioned a little further away than arm's length. Also, if the user is screened to some extent from an event taking place, such as by others in front of the user, the user benefits from elevating the smartphone above the user's head to take the desired pictures or video. In other instances, a better overall perspective is provided when the camera is elevated higher above ground or located low to the ground or reaching laterally around corners or other obstacles.

The extent to which the smartphone can be remotely located and operated is limited by the height of the user and the length of the user's arms. This amount is often insufficient for the user to place the smartphone in the most optimal position. Furthermore, and especially when taking video, a user can become fatigued when holding the smartphone at a distance away from one's body for a prolonged period of time. Accordingly, a need exists for a better system for placing and holding a smartphone in an optimal position when utilizing the smartphone for taking still pictures or video.

In the camera accessory arts, it is known to support a camera on a distal end of a telescopic rod or pole by using a screw member interfacing with a camera's tripod screw hole or similar mounting thread. For instance, see U.S. Pat. No. 4,530,580 to Ueda or U.S. Pat. No. 8,002,480 to Polster, each incorporated herein by reference in their entirety. Such camera supports are not effective in supporting smartphones which do not have a tripod screw hole or similar mounting thread. Accordingly, a need exists for a smartphone accessory which can securely grip a smartphone at a distal end of an elongate pole and facilitate the use of the smartphone when spaced from a user by a length of such a pole.

SUMMARY OF THE INVENTION

With this invention a pole is provided which includes a smartphone support thereon. In preferred embodiments of the invention, the pole is also fitted with a shutter release to enable activation of the camera from a proximal end of the pole while the smartphone is attached to a distal end of the pole.

The pole preferably includes a plurality of telescoping sections which are able to be nested together within a lower handle section. The handle section acts as a handle preferably with a grip on an outer surface thereof. Each of the sections are preferably cylindrical and of similar shape but decreasing size as they extend progressively towards an upper end of the pole. In this way, the various sections can nest inside each other to provide a compact structure when stored, but to facilitate deployment to a length desired by the user when to be placed in use. A lowermost proximal end of the handle typically includes a cap which can be removed for placement of batteries therein to power any elements within the pole which provide enhanced features, such as a shutter release built into the pole.

The handle preferably includes at least one trigger thereon which is preferably in the form of button which can be depressed by a user to send a signal for control of the camera. In alternative embodiments multiple triggers could be provided and other forms of input devices including slides, switches and multiple buttons of different position, shape and size. A very simplest form of the invention could include no buttons at all and merely act as a support for the camera. In a preferred embodiment, one trigger is provided and this trigger provides a basic function of acting as a shutter release when the camera is taking still images and to act as an on/off switch when pressed to turn the camera from "record on" mode to "record off" mode when the camera is in a video recording mode.

The upper distal end of the pole includes a clamp or other support for securely holding a smartphone at the upper end. The clamp preferably includes two parts including a base and saddle part and an arm part. The arm is coupled to the saddle and slides relative to the saddle. The arm ends at a finger on an end of the arm opposite the saddle. This finger preferably extends perpendicularly from other portions of the arm. A resilient pad is preferably provided on a side of the finger facing the saddle.

The base includes a second finger-like structure similar to that on the arm with a surface which preferably extends away from the back on a side of the saddle most distant from the arm, with the surface extending perpendicularly from the back. A pad is preferably provided on a side of this surface facing the finger of the arm.

These two pads on the two fingers are preferably similar in character and formed of a somewhat resilient material, such as a polymeric hydrocarbon foam material. Various natural fibers could also alternatively function as the pads on the finger and the rest. The pads function to grip sides of the smartphone somewhat to hold the smartphone securely to the clamp.

The arm slides relative to the saddle so that the finger of the arm can be spaced away from the rest of the saddle at a distance precisely matching a dimension of the smartphone. Most preferably, this dimension of the smartphone spanned by the distance between the rest and the finger is a width of the smartphone between two lateral sides. Typical smartphones might have sizes between two inches and four inches for such a dimension.

The arm is preferably biased to tend to be closer to the base, such as by a spring. When forces are applied to the arm causing the arm to move away from the saddle, this spring is stretched (or otherwise loaded) and a force is thus exerted upon the arm tending to cause the arm to return back toward the saddle. This force acts to hold the smartphone, along with friction forces associated with the pads on the finger, so that the smartphone remains securely held by the clamp.

A coupling joins the clamp to the upper end of the pole. This coupling is preferably in the form of a pivot joint or universal joint so that an angle of the clamp to the pole can pivot (or swivel) and enable the smartphone to exhibit a variety of different fixed angles relative to the pole. This coupling also preferably is detachable, such as by providing a screw coupling on the pole distal end similar to the screw member for connection to the tripod and mount hole of a camera in the prior art. A threaded hole can be provided on a bottom of the base of the clamp for connection with the screw coupling. In this way, the pole can be used with cameras and the clamp with associated smartphone can be used with tripods or other camera support equipment.

In the most preferred embodiment, the pole includes not only smartphone support but also a shutter release feature. In one embodiment this shutter release feature is provided by having a cable extend from the upper end of the pole to an interface. This cable is flexible and has a length similar to a length of the pole. The interface at the end of the cable in the embodiment disclosed is sized to fit within an input accessory port of the smartphone. Such input ports are known in smartphones to send signals to the smartphone. A microphone of the smartphone could also act as the input when an audible sound signal of appropriate type is sent to the smartphone to cause a picture to be taken. Input ports can come in a variety of different configurations on different smartphones. The interface is selected to fit within the available input ports for the particular smartphone. In the embodiment shown, this interface is particularly configured to fit within the microphone/input port 3.5 mm mini jack plug of an iPhone 5 provided by Apple, Inc. As an alternative to the cable, the handle or other portion of the apparatus has a Bluetooth antenna or other public band wireless networking technology compatible with wireless receiver equipment on the smartphone so that the shutter release feature or other control features operate wirelessly.

Adapters could be provided with one side which attaches to this interface and a second side which could fit into other input ports of other types on various smartphones. As another alternative, the interface could be in the form of a button actuator and include a clamp which could clamp onto the smartphone adjacent a button on the smartphone or a portion of the touchscreen display of the smartphone which is utilized to take a picture or turn on and off a video recording feature of the camera. In this way, when the trigger adjacent the handle of the pole is engaged, a mechanical force would be applied to the appropriate location to toggle the appropriate button or to touch the appropriate portion of the display to cause the shutter release or video on/off function to occur.

In the embodiment shown, the trigger merely sends an electric signal or other signal to the smartphone correlating with what is required for the smartphone to take a picture. In particular with this embodiment, the trigger sends an electric signal to the input port of the smartphone. As an alternative, the electronic signal could be sent to a sound generating device which causes a sound to be generated. This sound is detected by the microphone of the smartphone. Software associated with the smartphone is programmed so that when the particular sound generated by depressing of the trigger is sensed by the microphone within the smartphone, that the software causes the shutter release to be activated and for a picture to be taken, or if in record mode, for the recording function to be started (or stopped if the recording mode was already engaged).

If multiple triggers are provided on or adjacent the handle, these buttons can send unique electric signals to perform unique camera functions, or be coupled to the sound generating device and cause the sound generating device to produce separate distinct sound signals. These different electric or sound signals will be picked up by the smartphone inputs or microphone and then software sampling signals received by the smartphone would detect which signal was sent and correlate that sensed signal with the particular function to be provided.

For instance, if a picture taking trigger is depressed, an electric signal will be sent to the smartphone which would correlate this first signal with a shutter release function for taking of a still image. If a second trigger or other button is depressed which is provided for control of video, an electric signal will be sent to the smartphone and detected by the software as a video control signal and then cause video recording or other functions to commence or cease.

The first and second signals (and potentially other signals) could be different from each other by having different frequencies, different durations, different encoded sequences, or any other differences which can be differentiated by software that receives signals picked up from the microphone. Other features which could be controlled from the handle could include zoom in and zoom out, and any other controls which currently exist in smartphone cameras or might be developed in the future for smartphone cameras.

While the cable and interface are shown as configured to provide an electric signal to the smartphone 3.5 mm mini jack plug, which would pass into some input/output port of the smartphone, other connections could be used. For instance, the interface could be in the form of a USB connector for smartphones which have such a port thereon, or could be in the form of another power and data transfer port provided on a smartphone, either in a form currently in existence or in a form developed in the future.

When the user is finished utilizing the pole, the telescoping sections can be collapsed together into the handle section and the interface can be removed from the microphone port or the cable can otherwise be removed from the smartphone. The smartphone can then be removed from the clamp. The handle has a compact form so that it takes only a small amount of space. In the embodiment shown, when the pole is collapsed it has a length of 34.5 centimeters and when extended has a length of 94 centimeters. Three telescoping sections are provided. In alternative embodiments, a greater number of telescoping sections could be provided so that a greater difference exists between the collapsed length of the pole and the extended length of the pole. The various sections could be made longer as well or a greater number of sections could be provided if distance greater than that illustrated is desired.

OBJECTS OF THE INVENTION

Accordingly, a primary object of the present invention is to provide an accessory for holding a smartphone away from a user, such as on a pole or coupled to a louver of an air conditioning vent, such as that in an automobile.

Another object of the present invention is to provide an elongate pole and smartphone support which can hold a smartphone at a distal end of a pole for positioning of a camera on the smartphone for taking a picture of the user or otherwise positioning the smartphone where desired to provide the desired camera angle when taking a picture or for recording video.

Another object of the present invention is to provide a pole with smartphone support which firmly holds the smartphone to the apparatus in a removable fashion.

Another object of the present invention is to provide a pole with smartphone support which also incorporates a shutter release with a trigger on a handle of the pole and with an interface to the smartphone for causing the smartphone to take a picture when the trigger is engaged by a user.

Another object of the present invention is to provide a method for taking a self portrait photograph with a smartphone from a greater distance than a length of the user's arm.

Another object of the present invention is to provide a smartphone support with accessories for supporting of the smartphone in various different locations, which accommodates smartphones of different sizes and styles with a single support structure.

Other further objects of the present invention will become apparent from a careful reading of the included drawing figures, the claims and detailed description of the invention.

DESCRIPTION OF THE PREFERRED EMBODIMENT

Figures 8, 9:
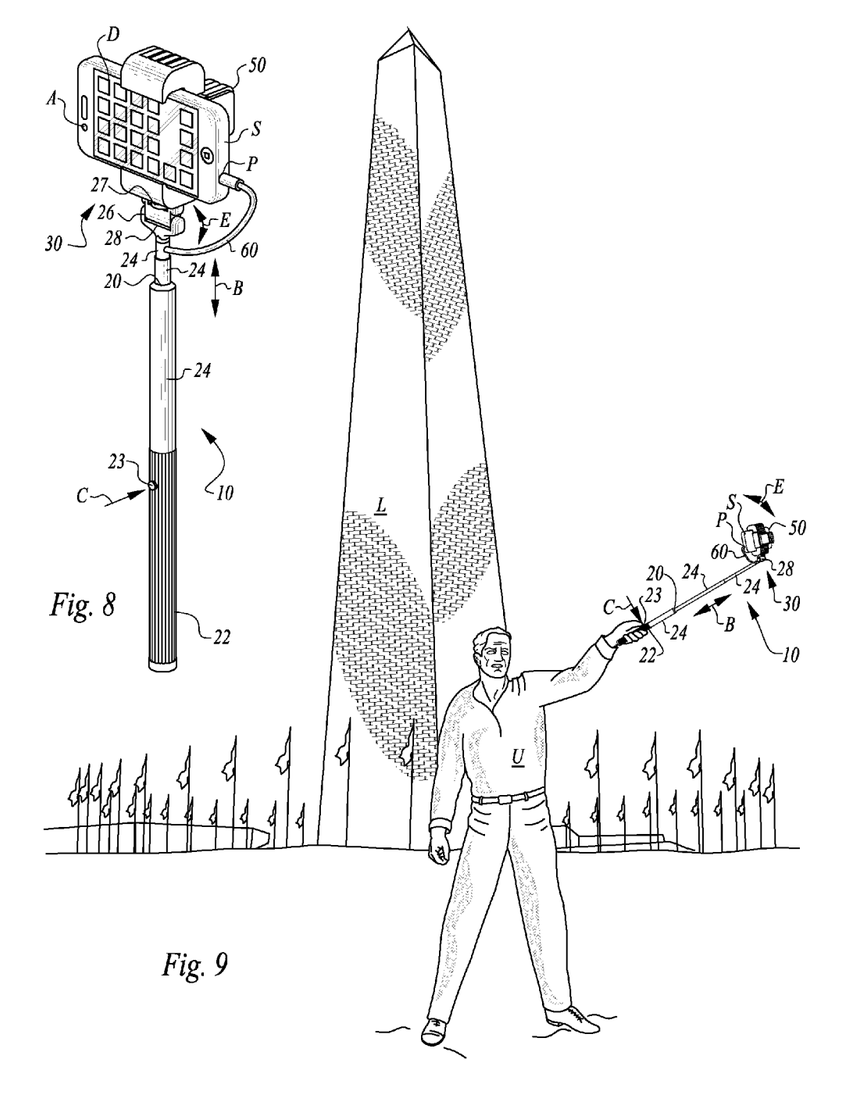
FIG. 8 is a perspective view of the entire assembly of this invention, supporting a smartphone at a distal end thereof.
FIG. 9 is a perspective view of the assembly in use with a smartphone to take a self portrait photograph.

Referring to the drawings, wherein like reference numerals represent like parts throughout the various drawing figures, reference numeral 10 is directed to an assembly generally including a pole 20 and a clamp 30 (FIG. 8). The clamp 30 is configured to releasably hold a smartphone S thereto, as a preferred form of smartphone S support. The pole 20 can be removed from the clamp 30 so that the pole 20 and clamp 30 can be used separately if desired. The pole 20 preferably telescopes so that its length is adjustable. When the clamp holds a smartphone S and is mounted on the pole 20, a user U can hold the smartphone S away from the user U and take a self portrait photograph of the user U within a landscape L, according to one use for the assembly 10 of this invention (FIG. 9).

In essence, and with particular reference to FIG. 8, basic details of the assembly 10 are described, according to a preferred embodiment depicted herein. The assembly 10 generally includes two subparts including a pole 20 and a clamp 30, providing a preferred form of support for a smartphone S. The pole 20 can be used separate from the clamp 30, such as to support a camera having a threaded hole thereon such as that utilized to attach to a tripod. The pole 20 can thus act as a monopod for a camera in one use for the pole 20 separate from the clamp 30.

The clamp 30 is configured to removably hold a smartphone S securely thereto. The clamp 30 generally includes two portions which grip opposite edges of the smartphone S. These two portions of the clamp 30 are biased toward each other with a bias element, provided as a spring 40 in this embodiment. The clamp 30 includes a vent coupling 50 on a rear side thereof opposite where the smartphone S is held to the clamp 30. This vent coupling 50 is configured so that it can hold the clamp 30 and the associated smartphone S to louvers of an air conditioning vent, such as that provided within a car on a dashboard thereof, so that the smartphone S can be held with a display D of the smartphone S facing a driver or other passengers within a vehicle, without requiring that the smartphone S be held by hands of the user U. A cable 60 is preferably provided extending from the pole 20 to an accessory port P on the smartphone S. This cable interfaces with a trigger 23 on the pole 20 so that a signal is sent from the trigger 23 through the cable 60 to the smartphone S. This signal can initiate the taking of a photograph or control of video recording on the smartphone without the user needing to do anything other than push the trigger 23.

More specifically, and with continuing reference to FIG. 8, particular details of the pole 20 are described, according to this exemplary embodiment. The pole 20 is elongate in form with a distal end 26 opposite a handle 22 at a proximal end of the pole 20. The pole 20 preferably is elongate in form and provided with multiple separate telescoping sections 24 which nest inside each other and within the handle 22. The pole 20 is thus extendible (along arrow B of FIGS. 8 and 9) to move the distal end 26 further from the handle 22 if desired, but return the telescoping sections 24 back into the handle 22 when desired for storing of the pole 20 in a shorter form.

For instance, it is desirable that the pole 20 have a collapsed length small enough to fit within a typical purse (i.e. approximately twelve inches or less in length) and also fit within other storage locations such as a glovebox within a car. A handle 22 is provided with the trigger 23 thereon and can also be provided with a grip on an outer surface of the handle 22 for comfort and secure handling of the handle 22.

Figure 12:
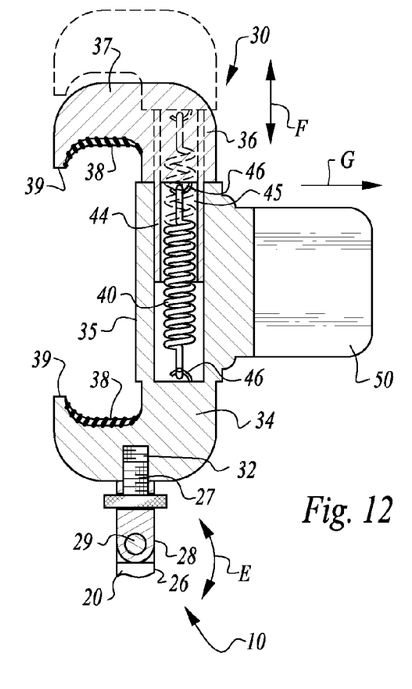
FIG. 12 is a side elevation full sectional view of the clamp according to this embodiment of this invention, with the clamp having portions thereof shown in broken lines to illustrate how portions of the clamp move to releasably grip a smartphone.

The distal end 26 preferably has a pivot joint 28 thereon which also integrates a screw coupling 27 and which pivots upon an axle 29 (FIG. 12). The screw coupling 27 enables removable attachment to the clamp 30 or other smartphone S support. This screw coupling 27 also allows the pole 20 to be used with a camera through the threaded bore typically provided on a camera for attachment to a tripod. In this manner, the pole 20 can act as a monopod for use with a camera in addition to its use with the clamp 30 or other support for holding of a smartphone.

The pivot joint 28 allows the clamp 30 to be pivoted relative to the pole 20 by rotation about the axle 29 (along arrow E). While the pivot joint 28 is shown as having a single axle 29 for pivoting in a single direction, it is conceivable that the pivot joint 28 could be in the for of a universal joint, such as with a ball connected to one portion of the pivot joint 28 residing within a socket on another portion of the pivot joint, to enable pivoting about two different pivoting axes perpendicular to the central axis of the pole 20, as well as potentially rotation about this long axis of the pole 20.

The pole 20 typically has a diameter of approximately one inch, enabling the handle 22 to be easily gripped within a hand of a user U. The handle 22 could have a slightly larger diameter, such as up to about two inches or a slightly smaller diameter, such as down to about three-quarters of an inch or less, if desired. The pole 20 preferably has a length of approximately three feet when fully extended, but could be longer, such as up to six to ten feet, or could be restricted to a shorter amount of extension, or even be fixed in length in some embodiments.

In a preferred embodiment, the trigger 23 is coupled to a switch in an electric circuit which runs through a hollow center of the telescoping sections 24 up to a hole 64 near the distal end 26. Wiring can be coiled in an outer jacket which holds this coiled form, such as that which is common on wired telephone handset cords, to accommodate length adjustment along with the telescoping sections 24 of the pole 20 if desired. This hole 64 allows a cable 60 with this electric circuit housed therein to extend out of the pole 20 interior to an interface 62 which can be plugged into an accessory port P or other port on the smartphone S. If required, power can be supplied by the pole, such as from batteries at a lower end of the handle to power the circuit.

Electronics or software within the smartphone S is configured so that when this circuit is closed by toggling the trigger 23 (or a signal is initiated and sent), some action is caused to occur. Most typically, this action is causing the camera in the smartphone S to take a picture, such as by actuating the aperture of the camera. If the camera is in a video mode, pushing of the trigger 23 can cause the video to transition from "stop" to "record" or back from "record" to "stop."

In alternative embodiments other functions of the smartphone could be actuated by the trigger 23 for operating of special features of the camera, such as zoom or to operate other software or electronics on the smartphone S other than a camera thereon. In alternative embodiments multiple buttons or other triggers could be provided rather than just the one trigger 23 in this exemplary embodiment, such as to allow for controlling zoom and the aperture or record button all from the handle 22. It is also conceivable that some smartphone S control features could be voice initiated, or even all of the smartphone S control features including camera operation could be voice operated without requiring the trigger 23 at all.

In an alternative embodiment, the handle 22 or other portion of the assembly 10 an have a Bluetooth antenna or other wireless networking technology which is compatible with a receiver on the smartphone S so that the shutter release or other smartphone S operating command is transmitted wirelessly to the smartphone.

Figure 10:
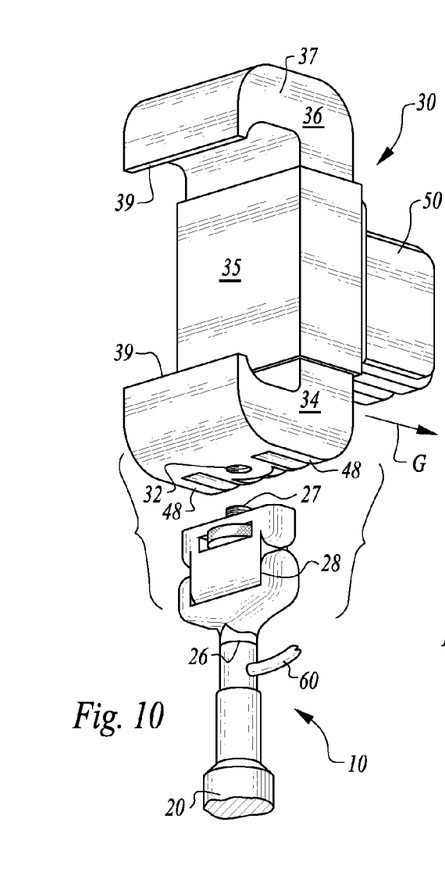
FIG. 10 is a perspective partially exploded view of that which is shown in FIG. 1, illustrating how the clamp or other support for the smartphone can be detached from the pole, such as to allow the clamp or other support to be used separate from the pole.
Figure 11:
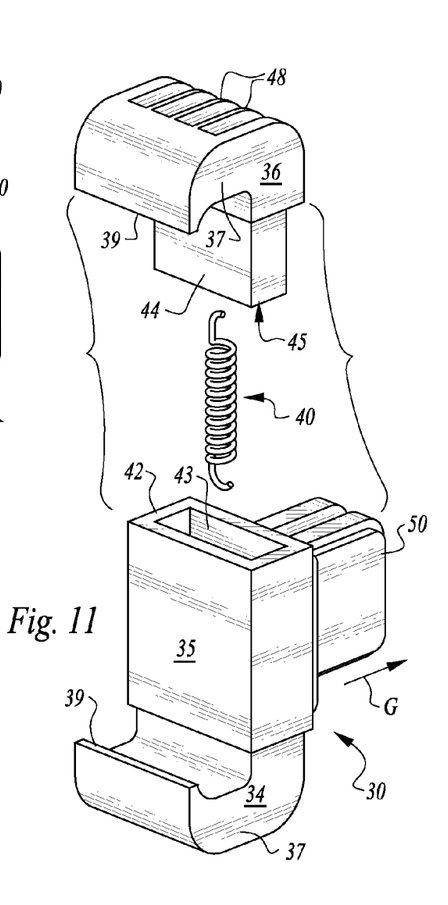
FIG. 11 is a perspective exploded parts view similar to that which is shown in FIG. 10, but with portions of the clamp exploded away from each other and showing a location for a spring to bias various portions of the clamp toward each other for gripping of the smartphone.

With particular reference to FIGS. 10-12, specific details of the clamp 30 are identified, describing a preferred form of smartphone S support in this exemplary embodiment. The clamp 30 generally includes two portions which move relative to each other and are biased toward each other so that they can firmly grip a smartphone S therebetween. These two parts can generally be referred to as a base 34 and an upper arm 36. The base 34 includes an arm portion which matches the upper arm 36 in a preferred form of this invention, and also includes a saddle 35 defining a midportion of the clamp 30 between the base 34 and upper arm 36 of the clamp 30.

The base 34 is preferably fixed to the saddle 35, while the upper arm 36 can translate relative to the base 34 and saddle 35 for adjustability of the clamp 30 in gripping the smartphone S. The upper arm 36 and arm of the base 34 preferably each extend through fingers 37 which extend preferably perpendicularly away from the saddle 35 with surfaces of the two fingers 37 facing each other. These fingers 37 preferably terminate at overhangs 39 which extend slightly toward each other. Surfaces of the fingers 37 which face each other preferably have resilient pads 38 thereon which can be deformed when forces are applied thereto, such as by contact with an edge of a smartphone S. This resilient pad 38 preferably also exhibits a high coefficient of static friction to assist in firmly but gently holding the smartphone S without movement relative to the clamp 30. In one embodiment this resilient pad 38 is in the form of foam rubber.

The surfaces of the fingers 37 are preferably spaced apart from each other a distance slightly less than a width of a smartphone S when the upper arm 36 is in a closest position to the base 34. The upper arm 36 can move away from the base arm 34 so that a distance between the fingers 37 increases to a distance greater than a width of the smartphone S. This distance of movement preferably not only accommodates a smartphone S of a single width, but rather is sufficiently great so that smartphones S having different widths can all be accommodated by a single size (or small subset of sizes). Also, the overhangs 39 are sufficiently spaced from the saddle 35 to accommodate a thickness of various smartphones S with edges of the smartphones S inboard of the overhangs 39 to further assist in securely holding the smartphone S to the clamp 30.

To bias the upper arm 36 toward the base 34, a bias element is preferably provided therebetween, most preferably in the form of a spring 40 (FIGS. 11 and 12). While this spring 40 could be any of a variety of different springs, in this embodiment the spring is a helical torsion spring which can be stretched linearly but exerts a return force on structures coupled to ends of the spring 40 when the spring 40 is so stretched. The spring 40 is provided with an original rest length which is shorter than a distance between the upper arm 36 and base 34. Thus, when the upper arm 36 moves away from the base 34, the spring 40 is stretched. The spring 40 is selected to have sufficient travel to allow the upper arm 36 to translate away from the base 34 a distance sufficient to allow smartphones S of various widths to be placed between the fingers 34 to be held to the clamp 30.

The upper arm 36 is configured to include a tenon 44 extending toward the base 34. The base 34 and saddle 35 include a mortise 42 which extends towards the upper arm 36. The mortise 42 includes a recess 43 therein sized to receive the tenon 44 therein and allow translation of the tenon 44 within the recess 43 of the mortise 42. The tenon 44 also preferably has a hollow core 45. The hollow core 45 is sufficiently large to allow the spring 40 to reside within this hollow core 45 at least partially. Hooks 46 are provided within an interior of the hollow core 45 of the tenon 44 and within an interior of the recess 43 of the mortise 42 to allow attachment to ends of the spring 40. In alternative embodiments, other forms of spring and attachments can be provided within the upper arm 36 and base 34.

The upper arm 36 and base 34, as well as portions of the saddle 35 preferably have fins 48 thereon on a side thereof generally referred to as a rear, and opposite a side of these structures to which the smartphone S is attached. These fins 48 decrease an amount of material and hence a weight of the clamp 30. Also, because smartphones S can generate some degree of heat in regular operation, and having the smartphone S adjacent surfaces of the clamp 30 could to some extent diminish the ability of the smartphone S to transfer heat away from electronics within the smartphone S, the fins 48 provide additional surface area for heat transfer, to preserve optimal smartphone S operation.

Other forms of smartphone S holding features could be supplied by the clamp 30 in alternative embodiments. For instance, the clamp could have structures which are sized to precisely match the particular dimensions of particular smartphones so that a series of clips could be utilized or other structures and the smartphone S could snap into the clips of such an alternative clamp or otherwise be grasped or retained by such smartphone S specific elements of such an alternative clamp to securely hold the smartphone to the clamp.

Figure 1:
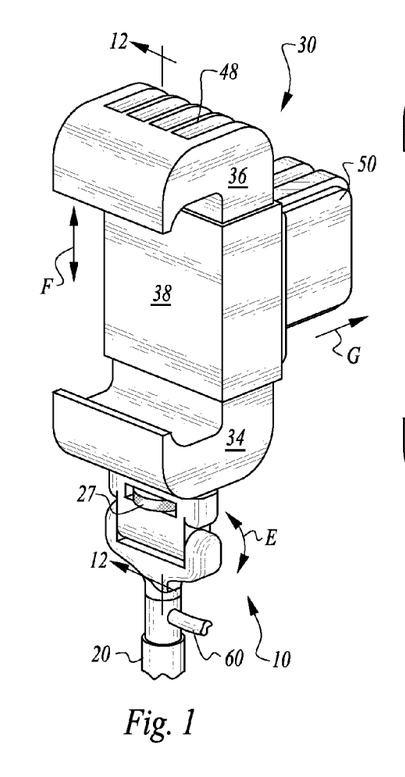
FIG. 1 is a perspective view of a distal end of the assembly of this invention showing distal portions of a pole thereof and a clamp attached to the pole and providing a preferred form of support for a smartphone.
Figure 2:
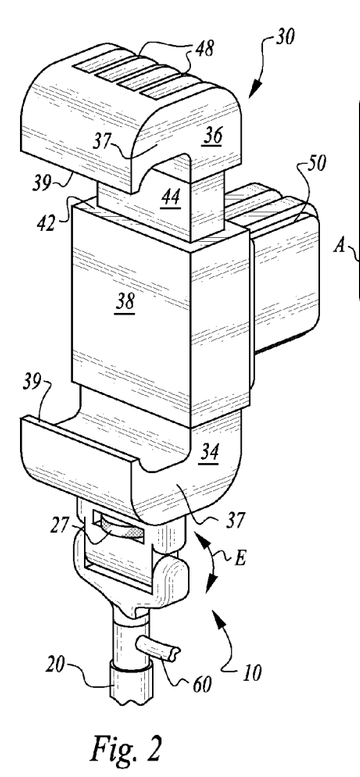
FIG. 2 is a perspective view of that which is shown in FIG. 1, with the clamp shown opening to receive a smartphone therein.
Figure 3:
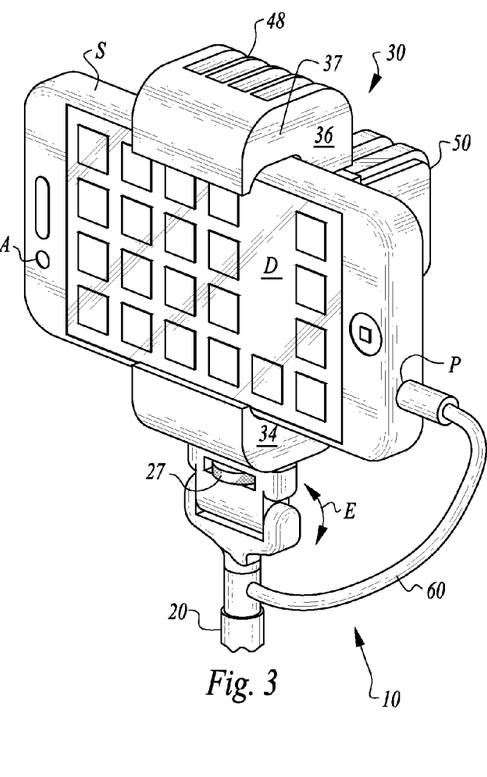
FIG. 3 is a perspective view similar to FIGS. 1 and 2, but with a smartphone shown supported thereby and with the clamp closed upon the smartphone to securely hold the smartphone, as well as showing an interface between the assembly and the smartphone plugged in, such as to act as a shutter release for a camera on the smartphone.
Figures 4, 5, 6, 7:
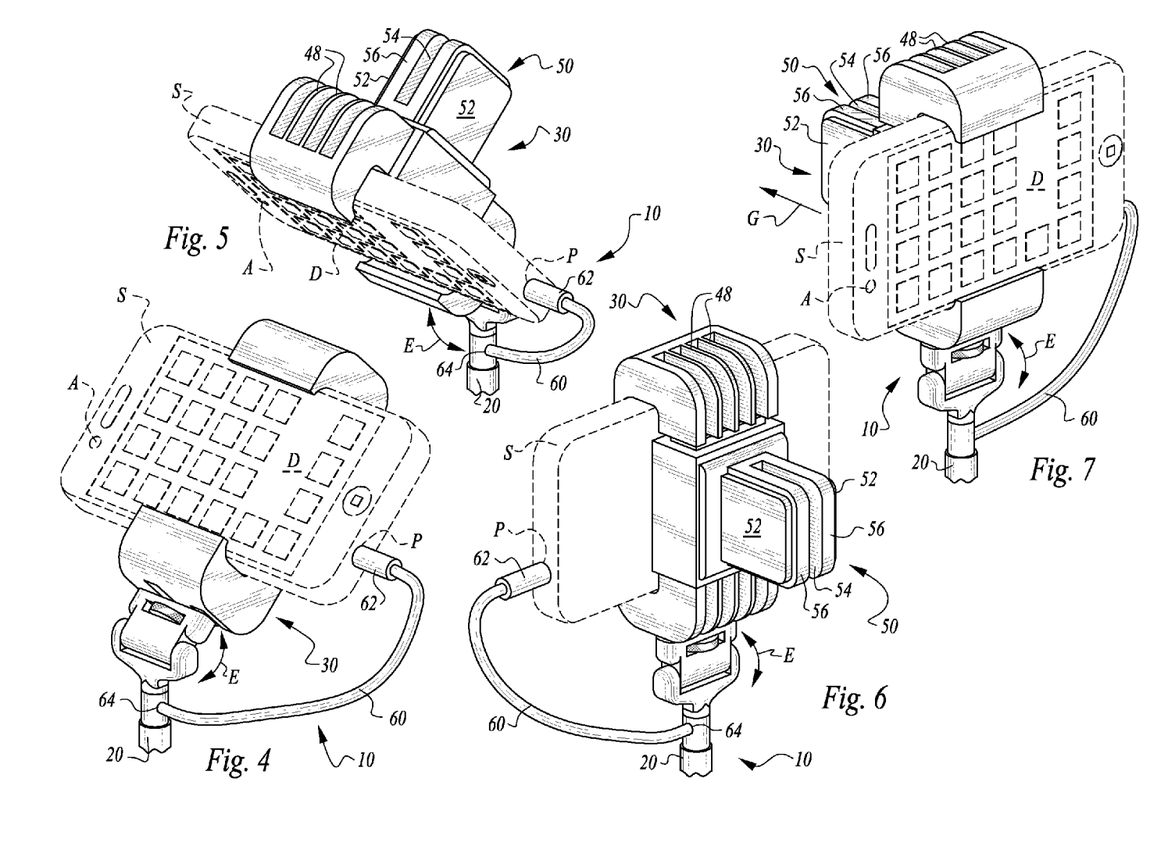
FIGS. 4 and 5 are perspective views similar to that which is shown in FIG. 3 and illustrating how the clamp or other smartphone support at the distal end of the assembly can pivot relative to the pole, the smartphone shown in broken lines.
FIG. 6 is a perspective view from the rear of that which is shown in FIG. 3, and with the smartphone shown in broken lines.
FIG. 7 is a perspective view similar to that which is shown in FIG. 6, but shown from the front, and with the smartphone shown in broken lines.

With particular reference to FIGS. 5-7, details of the vent coupling 50 are described, according to this exemplary embodiment. The clamp 30 or other support is preferably configured to be removably attachable to the pole 20 and to allow the clamp 30 to hold the smartphone S adjacent a thin planar structure, such as a louver within an air conditioning vent, such as that often located on a dashboard of a motor vehicle. The vent coupling 50 is provided in the form of a pair of plates 52 extending parallel to each other and away from a rear side of the clamp 30. These plates 52 are spaced apart by a gap 54 therebetween.

A resilient liner 56 is preferably provided overlying at least inside surfaces of the plates 52 lining the gap 54. This resilient liner 56 provides a resilient surface, such as formed of foam rubber, which can be compressed somewhat and have an interference fit with a louver of an air conditioning vent. The louver of the air conditioning vent can be slipped into a slot between portions of the resilient liner 56 within the gap 54 so that this louver can be securely held to the vent coupling 50 and so that the entire clamp 30 and associated smartphone S can be securely held to the louver of the air conditioning vent. Other thin structures could also conceivably be used for attachment of the clamp 30 and associated smartphone S thereto, provided that the structures are sufficiently thin that they can fit within the gap 54. The display D on the side of the smartphone S opposite the vent coupling 50 is then presented for viewing by a user U.

While the vent coupling 50 is shown with the gap 54 oriented vertically, it is conceivable that this gap 54 could be oriented horizontally, or where the plates 52 attach to the rear of the clamp 30, these plates 52 could be rotatably mounted to the rear of the clamp 30 so that the vent coupling 50 can rotate relative to the clamp 50 to different orientations to accommodate louvers having different orientations, and still support the smartphone S in the orientation desired. As an alternative, the tenon 44 and recess 43 in the mortise 42 can be sufficiently long to allow the upper arm 36 to translate sufficiently far from the base arm 34 to accommodate the smartphone S in two different orientations. The first orientation would be that depicted in FIGS. 3-9. A second orientation would be rotated 90° from that which is depicted in FIGS. 3-9, with the "height" of the smartphone S extending between the fingers 37 of the clamp 30.

While the smartphone S is shown in the figures with the display D facing the user U and this would be the typical orientation, it is conceivable that the smartphone S could be positioned so that the display D faces away from the user U, such as to allow someone besides the user U to view the display D at least somewhat or to allow for either a rear facing or a forward facing camera to be utilized either facing back towards the user U or away from the user U. While operation of this invention is primarily in conjunction with the concept of having both the display D an the aperture A facing back towards the user U for taking of a self portrait photograph, the orientation can remain approximately the same, but a forward facing camera can instead be utilized for taking of pictures or video in a direction away from the user U. For instance, the pole 20 can be utilized to allow a user to take a picture over an object blocking the user's view, such as when taking pictures or video in a crowd, by elevating the smartphone S somewhat above the user U.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A pole with smartphone support and shutter release, comprising in combination:
    an elongate pole having a proximal end and a distal end;
    a trigger located closer to said proximal end than to said distal end;
    a clamp located closer to said distal end than to said proximal end;
    said clamp configured to hold a smartphone thereon;
    an interface, said interface configured to communicate with a portion of the smartphone to deliver a signal from said trigger to the smartphone to cause the smartphone to impart a control signal to a camera associated with the smartphone; and
    wherein said clamp includes a vent louver coupling thereon including at least two plates with a gap between said plates, said gap sized to have a louver of a vent fit therein for supporting said clamp upon said louver of said vent.

2. The combination of claim 1 wherein said pole includes a plurality of separate telescoping sections such that said distal end can be moved relative to said proximal end.

3. The combination of claim 1 wherein said interface includes a cable extending from said pole and attaching to an input port of the smartphone, said cable sending an electronic signal through an input interface of the smartphone and with software on the smartphone detecting the electronic signal passing through the cable associated with actuation of said trigger, to cause camera operation.

4. The combination of claim 3 wherein the camera operation is in the form of a shutter release causing the camera to take a still picture.

5. The combination of claim 1 wherein said interface includes a wireless transmitter compatible with a receiver in the smartphone.

6. The combination of claim 1 wherein said clamp includes a base on a proximal side of said clamp and an upper arm on a distal side of said clamp, said upper arm spaced from said base by a saddle, said upper arm and said base biased to move toward each other such that a smart phone can be gripped between said base and said upper arm.

7. The combination of claim 6 wherein said base and said upper arm each include a finger extending laterally relative to said saddle with said finger of said upper arm and said finger of said base having surfaces facing each other, and with said surfaces positioned to rest against edges of a smartphone when a large surface of said smartphone is adjacent said saddle, said fingers moving toward each other until said fingers impact the edges of the smartphone for holding of the smartphone between said fingers, under force applied by a bias element within said clamp.

8. The combination of claim 7 wherein each of said fingers includes an overhang on a portion thereof most distant from said saddle, said overhangs extending further toward each other than other portions of said finger of said upper arm and said finger of said base.

9. The combination of claim 7 wherein said surfaces of said fingers which face each other include a resilient pad thereon.

10. The combination of claim 6 wherein a spring is interposed between said base and said upper arm, said spring exerting a force tending to draw said upper arm toward said base.

11. A pole with smartphone support and shutter release, comprising in combination:
    an elongate pole having a proximal end and a distal end;
    a trigger located closer to said proximal end than to said distal end;
    a clamp located closer to said distal end than to said proximal end;
    said clamp configured to hold a smartphone thereon;
    an interface, said interface configured to communicate with a portion of the smartphone to deliver a signal from said trigger to the smartphone to cause the smartphone to impart a control signal to a camera associated with the smartphone;
    wherein said clamp includes a base on a proximal side of said clamp and an upper arm on a distal side of said clamp, said upper arm spaced from said base by a saddle, said upper arm and said base biased to move toward each other such that a smart phone can be gripped between said base and said upper arm;
    wherein a spring is interposed between said base and said upper arm, said spring exerting a force tending to draw said upper arm toward said base; and
    wherein said upper arm includes a tenon extending therefrom toward said base and said base is fixed to said saddle with said saddle configured to include a mortise with a recess therein, said recess sized and oriented to receive said tenon therein in a sliding fashion, said tenon including a hollow core with said spring located within said hollow core of said tenon at least partially, and with ends of said spring coupled to said upper arm and said base, said spring configured as a helical tension spring to exert a force drawing said upper arm toward said base unless resisted by the smartphone between said upper arm and said base.

12. The combination of claim 1 wherein said elongate pole is removably attachable to said clamp, and wherein a resilient liner is located between said plates of said vent louver coupling and within said gap, said resilient liner having a slot therein within said gap which can receive said louver of said vent therein with a friction fit.

13. A pole with smartphone support, comprising in combination:
    an elongate pole having a proximal end and a distal end;
    a clamp located closer to said distal end than to said proximal end;
    said clamp configured to hold a smartphone thereon;
    wherein said clamp includes a base on a proximal side of said clamp and an upper arm on a distal side of said clamp, said upper arm spaced from said base by a saddle, said upper arm and said base biased to move toward each other such that a smart phone can be gripped between said base and said upper arm;

wherein a spring is interposed between said base and said upper arm, said spring exerting a force tending to draw said upper arm toward said base; and wherein said upper arm includes a tenon extending therefrom toward said base and said base is fixed to said saddle with said saddle configured to include a mortise with a recess therein, said recess sized and oriented to receive said tenon therein in a sliding fashion, said tenon including a hollow core with said spring located within said hollow core of said tenon at least partially, and with ends of said spring coupled to said upper arm and said base, said spring configured as a helical tension spring to exert a force drawing said upper arm toward said base unless resisted by the smartphone between said upper arm and said base.

14. The apparatus of claim 13 wherein said pole includes a plurality of separate telescoping sections such that said distal end can be moved relative to said proximal end.

15. The apparatus of claim 13 wherein said base and said upper arm each include a finger extending laterally relative to said saddle with said finger of said upper arm and said finger of said base having surfaces facing each other, and with said surfaces positioned to rest against edges of a smartphone when a large surface of said smartphone is adjacent said saddle, said fingers moving toward each other until said fingers impact the edges of the smartphone for holding of the smartphone between said fingers, under force applied by a bias element within said clamp;

wherein each of said fingers includes an overhang on a portion thereof most distant from said saddle, said overhangs extending further toward each other than other portions of said finger of said upper arm and said finger of said base; and wherein said surfaces of said fingers which face each other include a resilient pad thereon.

16. A pole with smartphone support, comprising in combination:

an elongate pole having a proximal end and a distal end;

a clamp located closer to said distal end than to said proximal end;

said clamp configured to hold a smartphone thereon; and wherein said clamp includes a vent louver coupling thereon including at least two plates with a gap between said plates, said gap sized to have a louver of a vent fit therein for supporting said clamp upon said louver of said vent.

17. The apparatus of claim 16 wherein said elongate pole is removably attachable to said clamp, and wherein a resilient liner is located between said plates of said vent louver coupling and within said gap, said resilient liner having a slot therein within said gap which can receive said louver of said vent therein with a friction fit.

* * * * *